United States Patent [19]

Basener

[11] Patent Number: 4,568,205
[45] Date of Patent: Feb. 4, 1986

[54] RACE WIRE BEARING

[75] Inventor: Helmut Basener, Hochstadt, Fed. Rep. of Germany

[73] Assignee: INA Walzlager Schaeffler KG, Fed. Rep. of Germany

[21] Appl. No.: 703,882

[22] Filed: Feb. 21, 1985

[30] Foreign Application Priority Data

Mar. 29, 1984 [DE] Fed. Rep. of Germany ....... 3411562

[51] Int. Cl.[4] .............................................. F16C 33/61
[52] U.S. Cl. ..................................... 384/501; 384/508
[58] Field of Search ............... 384/501, 508, 507, 510, 384/513

[56] References Cited

U.S. PATENT DOCUMENTS 328,176 10/1885 Bailey ................................... 384/508
2,624,644 1/1953 Bryant .................................. 384/508
3,144,278 8/1964 Pöhler et al. ........................ 384/501
3,332,728 7/1967 Gibson ................................. 384/501

Primary Examiner—Lenard A. Footland
Attorney, Agent, or Firm—Bierman, Peroff & Muserlian

[57] ABSTRACT

In a race wire bearing comprising two undivided, concentrically disposed race rings having race wires which are disposed in facing grooves and on which rolling members roll, the first race ring having two race wires, a carrying or support wire receiving the main axial load and a retaining wire receiving only the disengaging tilting moment, and being formed at a place on its periphery with a filling orifice closed by a plug, the improvement comprising the filling orifice (7,16) being disposed as to interrupt only one race wire, the interrupted race wire being a retaining wire (6,18) and the plug (3) having a raceway (8) which replaces the retaining wire (6,18) missing at the filling orifice.

7 Claims, 4 Drawing Figures

4,568,205

RACE WIRE BEARING

STATE OF THE ART

Race wire bearings comprising two undivided concentrically disposed race rings having race wires which are disposed in facing grooves and on which rolling members roll, the first race ring having two race wires—i.e., a carrying or support wire receiving the main axial load and a retaining wire receiving only the disengaging tilting moment—and being formed at a place on its periphery with a filling orifice closed by a plug are known. The advantage of this kind of bearing over constructions wherein one of the race rings is divided to facilitate assembly of the bearing is that, since neither race ring is divided, the strength, rigidity and accuracy of the bearing are improved and its production cost is considerably reduced. Another advantage is its low mass which is less than that of divided-ring bearings and which is due to the smaller race ring cross-sections required.

Bearing of this kind are known from U.S. Pat. No. 3,332,728 wherein the filling orifice in the race ring interrupts the two race wires. The same are so devised at the filling orifice that the interruption is of reduced length and also, the plug end face provides some radial guidance of the rolling members so that the bearing runs smoothly. However, the loadability of the known bearing is locally reduced at the filling orifice and so the advantages mentioned are not fully effective.

OBJECTS OF THE INVENTION

It is an object of the invention to provide a bearing of the kind referred to wherein the full loadability of the bearing is available at the filling orifice as well as elsewhere.

These and other objects and advantages of the invention will become obvious from the following detailed description.

THE INVENTION

The novel race wire bearing of the invention comprises two undivided, concentrically disposed race rings having race wires which are disposed in facing grooves and on which rolling members roll, the first race ring having two race wires, a carrying or support wire receiving the main axial load and a retaining wire receiving only the disengaging tilting moment, and being formed at a place on its periphery with a filling orifice closed by a plug, the improvement comprising the filling orifice being disposed as to interrupt only one race wire, the interrupted race wire being a retaining wire and the plug having a raceway which replaces the retaining wire missing at the filling orifice.

The effect of the construction of the bearing of the invention is that it is fully loadable at the filling orifice since the heavily loaded carrying wire is devoid of interruption by the filling orifice and the plug raceway bridges the interrruption in the retaining wire.

Another advantage of the bearing according to the invention is that, unlike the known bearing, the heavily loaded carrying wire is not inhibited from the wandering motion which race wires are of course bound to make relative to the race rings when the rolling members roll over the race wires under load. Therefore, there is no risk of the carrying wire jamming, an event which may entail serious malfunctionings.

The rolling bearing according to the invention can be produced very simply and cheaply if, in accordance with a variation of the invention, the filling orifice and the plug are cylindrical.

If, in accordance with a variation of the invention, the rolling members are balls and the two race rings have two race wires with raceways for the balls, the latter raceways being bounded on both sides by shoulders, the carrying wires are formed in their raceway shoulders near the filling orifice, with recesses which are disposed opposite the filling orifice and which are so dimensioned that the balls can be assembled without forcing. The recesses can be produced in a very simple manner if, in accordance with a feature of the invention, they are disposed at a gap in the associated carrying wire and are formed each as to half of its extent in the peripheral direction in the two wire ends which bound the gap.

According to a final feature of the invention, the rolling members are balls and the two race rings have two race wires having raceways for the balls, the latter raceways being bounded on both sides by shoulders to enable the balls to be introduced into the bearing without damage and a resilient intermediate ring is provided between the retaining wire not interrupted by the filling orifice and the wall of the associated groove.

REFERRING NOW TO THE FIGURES

Figure 1:
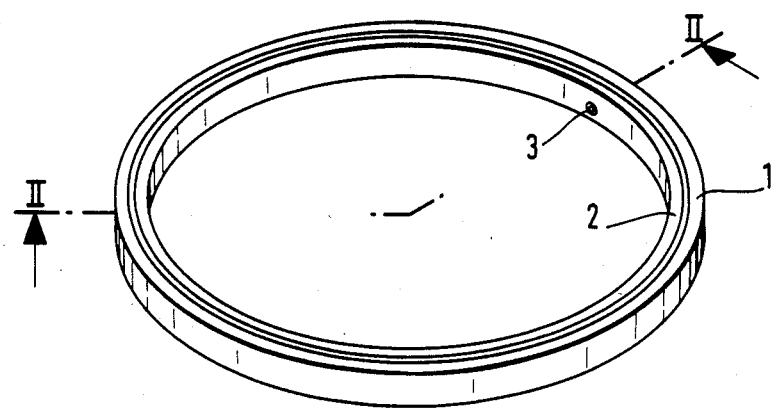
FIG. 1 is a perspective view in a considerably reduced scale of a race wire bearing of the invention.
Figure 2:
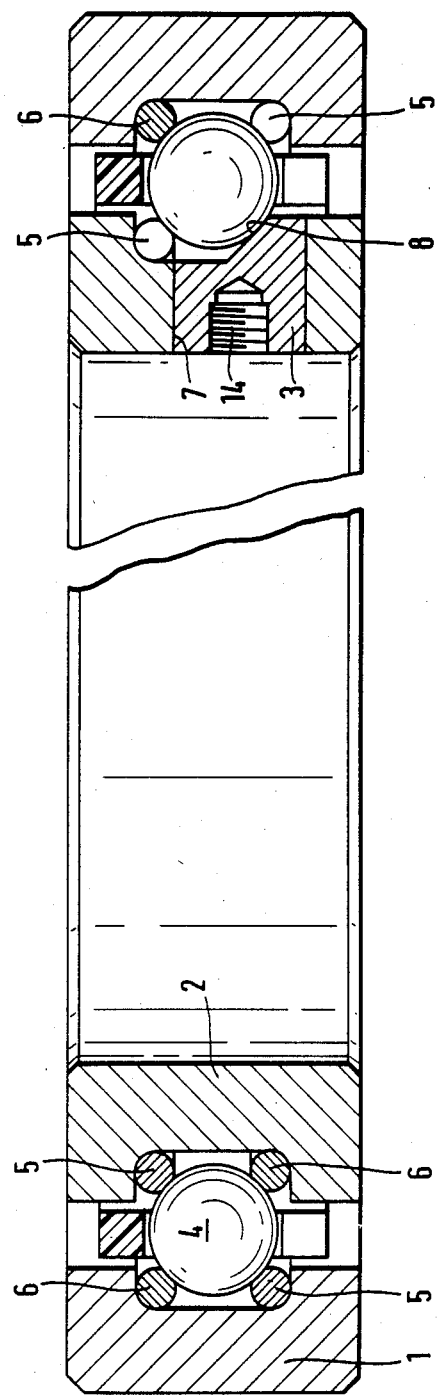
FIG. 2 is a cross section on the line II—II of FIG. 1.
Figure 3:
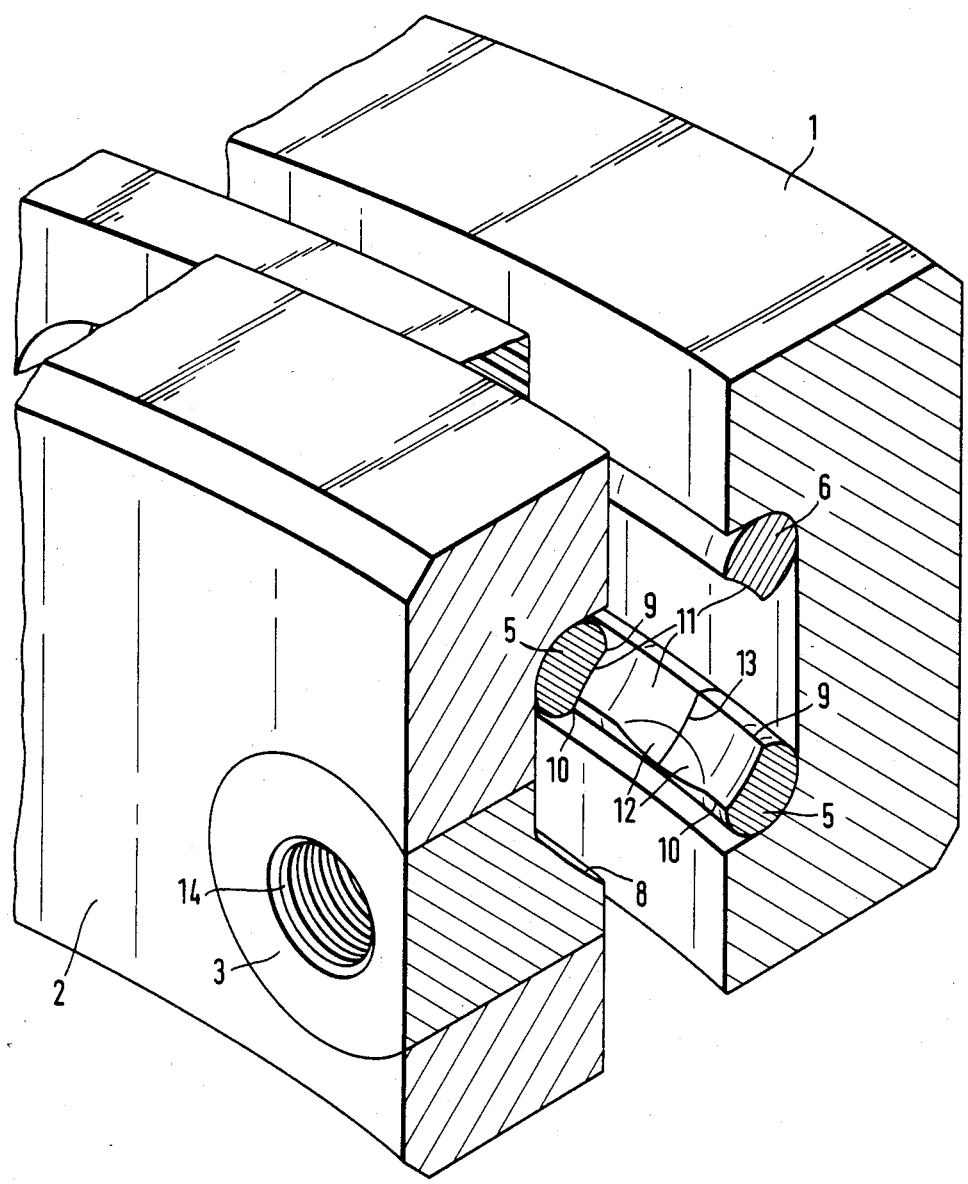
FIG. 3 is a perspective and enlarged view in partial longitudinal section through the bearing of the invention.

FIG. 1 shows a race wire bearing having an outer race ring 1 and an inner race ring 2 with the ring 2 being formed with a filling orifice closed by a plug 3. As FIGS. 2 and 3 show, the bearing is a four-point ball bearing and receives in grooves in its race rings 1 and 2 two race wires on which balls 4 roll. Throughout the drawings, race rings 1 and 2 are shown as having race wires 5 and 6, the race wires of like reference being disposed diametrically opposite one another. The orifice 7 in inner race ring 2 is so offset from the bearing center-plane to interrupt only race wire 6 of inner race ring 2, plug 3 having a raceway 8 which replaces race wire 6 at orifice 7.

The position in which the bearing is fitted should be chosen, depending upon the particular use required, so that race wires 5 act as carrying wires—i.e., they receive the main axial load—and races wire 6 act as retaining wires—i.e., they receive only any disengaging tilting moment which may arise.

Wires 5 and 6 have raceways 11 for balls 4, the raceways 11 being bounded on both sides by shoulders 9 and 10. Since the carrying-wire shoulders 10 near orifice 7 would make it difficult or, without damage, impossible to introduce balls 4 into the bearing, shoulders 10 are formed, as can be seen in FIG. 3, with recesses 12 dimensioned so that balls 4 can be assembled without forcing. Recesses 12 are disposed each as to half its extent in those two ends of the carrying wires 5 which bound a gap 13. Consequently, and as shown in FIGS. 2 and 3, the gaps 13 being associated with the recesses 12 must be disposed opposite the orifice 7 at least during assembly of the balls 4. Plug 3 is formed with a blind bore which has an internal screwthread 14 and into which a withdrawing tool can be screwed to remove plug 3 which is pressed into the orifice 7.

Conveniently, to produce raceway 8 of plug 3, the same is introduced into inner race ring 2 and the same is initially so machined, in the zone where retaining wire 6 will subsequently be disposed, as if it was to have a solid raceway instead of retaining wire 6, whereafter plug 3 is removed and the groove in inner race ring 2 for receiving retaining wire 6 is finish-machined.

Figure 4:
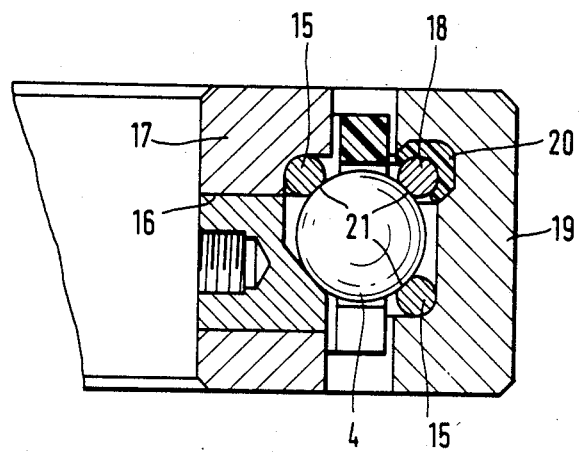
FIG. 4 is a partial longitudinal section through a bearing of the invention.

The bearing of the invention shown in FIG. 4 which is also a four-point ball bearing differs from the bearing of FIGS. 1 to 3 in that its carrying wires 15 are devoid of recesses opposite filling orifice 16 in inner race ring 17. Instead, a resilient intermediate ring 20 is provided between retaining wire 18 of outer race ring 19 and the groove receiving wire 18; ring 20 enables the balls to be fitted in the bearing without damage.

To introduce the balls 4 into the bearing, race rings 17 and 19 having the race wires 15 and 18 are disposed eccentrically of one another and to start with, as many balls 4 as possible are introduced into the bearing. The balls 4 are distributed over the bearing periphery so that rings 17 and 19 line up concentrically of one another. An axial force compressing resilient intermediate ring 20 is then applied to the bearing such force being sufficient to deform ring 20 so that rings 17 and 19 move axially relative to one another by an amount sufficient for the remaining balls 4 to be introduced without forcing over the shoulders of raceways 21 of wires 15 into the bearing. Once all balls 4 have been introduced, the axial force can cease to be applied to the bearing, the same then being a self-retaining unit. The bearing can be adjusted without clearance of preloaded by appropriate dimensioning of intermediate ring 20. Also, ring 20 improves the damping properties of the bearing.

Only four-point ball bearings are shown in the drawings but the invention is of course of use for other race wire bearings such as cross roller bearings, special provisions regarding the assembly of the rolling members possibly being unnecessary.

Also of course, and unlike what is illustrated, the filling orifice can be disposed in the outer race ring. The filling orifice and the plug can be in any shape other than cylindrical.

Various other modifications of the bearings of the invention may be made without departing from the spirit or scope thereof and it is to be understood that the invention is intended to be limited only as defined in the appended claims.

What I claim is:

1. In a race wire bearing comprising two undivided, concentrically disposed race rings having race wires which are disposed in facing grooves and on which rolling members roll, the first race ring having two race wires, a carrying or support wire receiving the main axial load and a retaining wire receiving only the disengaging tilting moment, and being formed at a place on its periphery with a filling orifice closed by a plug, the improvement comprising the filling orifice (7,16) being disposed as to interrupt only one race wire, the interrupted race wire being a retaining wire (6,18) and the plug (3) having a raceway (8) which replaces the retaining wire (6,18) missing at the filling orifice.

2. A bearing of claim 1 wherein the filling orifice (7) and the plug (3) are cylindrical.

3. A bearing of claim 2 wherein the rolling members are balls (4) and the two race rings (17,19) have two race wires (15,18) having raceways (21) for the balls (4), the latter raceways being bounded on both sides by shoulders and a resilient intermediate ring (20) is provided between the retaining wire (19) not interrupted by the filling orifice (16) and the wall of the associated groove.

4. A bearing of claim 2 wherein the rolling members are balls (4) and the two race rings (1,2) have two race wires (5,6) with raceways (11) for the balls (4), the latter raceways being bounded on both sides by shoulders (9,10); and the carring wires (5) are formed, in their raceway shoulders (10) near the filling orifice (7), with recesses (12) which are so disposed opposite the filling orifice (7) and which are so dimensioned that the balls (4) can be assembled without forcing.

5. A bearing of claim 1 wherein the rolling members are balls (4) and the two race rings (1,2) have two race wires (5,6) with raceways (11) for the balls (4), the latter raceways being bounded on both sides by shoulders (9,10); and the carrying wires (5) are formed, in their raceway shoulders (10) near the filling orifice (7), with recesses (12) which are disposed opposite the filling orifices (7) and which are so dimensioned that the balls (4) can be assembled without forcing.

6. A bearing of claim 5 wherein the recesses (12) are disposed at a gap (13) in the associated carrying wire (5) and are formed each as to half of its extent in the peripheral direction in the two wire ends which bound the gap (13).

7. A bearing of claim 1 wherein the rolling members are balls (4) and the two race rings (17,19) have two race wires (15,18) having raceways (21) for the balls (4), the latter raceways being bounded on both sides by shoulders and a resilient intermediate ring (20) is provided between the retaining wire (19) not interrupted by the filling orifice (16) and the wall of the associated groove.

* * * * *